UNITED STATES PATENT OFFICE.

JAMES W. TALLMADGE, OF BOSTON, MASSACHUSETTS.

IMPROVEMENT IN BROOM-CORN-SEED FLOUR FOR THE MANUFACTURE OF PASTE.

Specification forming part of Letters Patent No. 146,032, dated December 30, 1873; application filed October 22, 1873.

*To all whom it may concern:*

Be it known that I, JAMES W. TALLMADGE, of the city of Boston, county of Suffolk and State of Massachusetts, have made an invention called "Tallmadge's Broom-Corn-Seed Flour," to be used instead of wheat flour for making paste, of which the following is a specification:

To make the broom-corn-seed flour, crack a quantity of broom-corn seed in a feed-mill, set only fine enough to crush the seed open, then pass the cracked seed through a fanning-mill to separate the kernels from the hulls. Pare and boil a quantity of common potatoes, after which pass them, the potatoes, through a wire sieve, then spread and dry them thoroughly in an oven. After which mix ten pounds of the potatoes, prepared as above described, with every one hundred pounds of the kernels of broom-corn seed, prepared as above described; then grind, the mixture of potatoes and broom-corn seed, in a flouring-mill, and bolt in the usual way for making wheat flour.

The broom-corn-seed flour is to be used the same as wheat flour.

I claim as my invention—

The broom-corn-seed flour, composed of broom-corn seed and potatoes, prepared and made as herein described.

JAMES W. TALLMADGE.

Witnesses:
 WM. ROSCOE WILLIAMS,
 BENJAMIN W. FELTON.